United States Patent Office 2,844,619
Patented July 22, 1958

2,844,619

PROCESS FOR THE DEODORIZATION OF O,O-DIMETHYL-DITHIO-PHOSPHATE OF DIETHYL MERCAPTO-SUCCINATE

Juan Nebrera Escobar, Madrid, Spain

No Drawing. Application June 6, 1955
Serial No. 513,571

Claims priority, application Spain April 12, 1955

1 Claim. (Cl. 260—461)

The present invention relates to a process for the deodorization of O,O-dimethyl-dithio-phosphate of diethyl mercapto-succinate, utilizing to this effect an energetic oxidizing agent.

The product termed O,O-dimethyl-dithio-phosphate of diethyl mercapto-succinate possesses extraordinarily active properties applicable for destroying insects; however, it is likewise noted for its intense sulfurous emanations of a most loathsome smell, for which reason its application as an active insecticide has been restricted to a certain extent, that is to say, for the destruction of agricultural pests in open spaces.

With the object of also making use of the active principle of O,O-dimethyl-dithio-phosphate of diethyl mercapto succinate in the preparation of insecticides for use in closed spaces, as for example, domestic insecticides, divers studies and experiments have been made which have eventually led to the process claimed by the present invention and by means of which O,O-dimethyl-dithio-phosphate of diethyl mercapto-succinate is deprived of its offensive smell, without loss or affecting any of its original active properties applicable for the destruction of insects.

Upon initiating research work for the production of a deodorant for O,O-dimethyl-dithio-phosphate of diethyl mercapto-succinate, destitute of all detrimental action with respect to its insecticide potential, it was taken into account that said product is very sensitive to water and moisture, so that upon establishing contact with other bodies whose degree of moisture exceeds 2%, it will hydrolyze and thereby gradually lose its active properties.

The oxidizing capacity of chlorine was first taken into consideration, due to its great affinity with hydrogen and by virtue of which it will remove the hydrogen from all organic substances, decomposing same, or else produce a decomposition of any water present by liberating the oxygen that will oxidize said organic substances. However, although free available chlorine can only be applied with difficulty, this element offers certain alternatives, i. e. those of the hypochlorites, that are very active oxidizing agents, with the advantage that the hypochlorous acid of the hypochlorite can easily be freed by weaker acids, such as carbonic acid gas (carbon dioxide) from the atmosphere. It was thus found that any of the hypochlorites can readily be applied as a deodorant for O,O-dimethyl-dithio-phosphate of diethyl mercapto-succinate, though the best results have been obtained with sodium hypochlorite.

The present process consists in submitting O,O-dimethyl dithio-phosphate of diethyl mercapto-succinate to the oxidizing action of a hypochlorite solution, preferably of sodium hypochlorite, which is achieved by stirring O,O-dimethyl-dithio-phosphate of diethyl mercapto-succinate in an appropriate container while gradually adding thereto hypochlorite and extending said stirring operation over a period of 30 minutes at a temperature not in excess of 50° C. and thereafter allowing same to cool off to room temperature.

At this stage, the hypochlorite is removed from the solution by submitting the liquid mass to the action of a vacuum filter, or by decantation.

The resultant product is then finished and ready to be mixed with inert vehicles, or to be dissolved in water in compliance with a conventional formula.

Hereinafter, the process to which reference is made in the present specification, will be disclosed by means of a non-limiting example.

In an appropriate mixer having an enameled or vitrified bottom and provided with cooling means, there are placed 100 parts of O,O-dimethyl-dithio-phosphate of diethyl mercapto-succinate, and while this product is being stirred, 50 parts of an aqueous solution of sodium hypochlorite containing 47 to 50 parts by volume of hypochlorite per thousand parts by volume of solution are added gradually, taking care that the temperature does not exceed 50° C., and thereafter this stirring operation is extended over a period of 30 minutes, allowing the liquid mass to cool off to room temperature.

The mixer should be provided with a bell-shaped funnel capable of collecting, by suction means, all such gases that are produced during this reaction and to conduct these to the open air outside the building.

Thereafter the liquid mass is poured into a settling tank so as to separate the O,O-dimethyl-dithio-phosphate of diethyl mercapto-succinate from the hypochlorite solution and, when this is divided into two distinct layers, of which the upper is constituted by the hypochlorite solution and the lower by the O,O-dimethyl-dithio-phosphate of diethyl mercapto-succinate, these are then separated by the action of vacuum filtration, or by decantation. After having separated the active matter, this is then filtered.

What I claim is:

A process for the deodorization of O,O-dimethyl-dithio-phosphate of diethyl mercapto-succinate, which consists essentially in the gradual addition to the said O,O-dimethyl-dithio-phosphate of diethyl mercapto-succinate, with stirring, of an aqueous sodium hypochlorite solution containing 47 to 50 parts by volume of hypochlorite per thousand parts by volume of solution, 50 parts by volume of the said solution being added for each 100 parts by volume of O,O-dimethyl-dithio-phosphate of diethyl mercapto-succinate, continuing the stirring for about 30 minutes after completion of such addition, thereafter allowing the mixture to cool to room temperature, and separating the deodorized product from the hypochlorite solution.

References Cited in the file of this patent

UNITED STATES PATENTS

| 1,931,058 | Clemmensen | Oct. 17, 1933 |
| 2,578,652 | Cassaday | Dec. 18, 1951 |
| 2,713,018 | Johnson | July 12, 1955 |

OTHER REFERENCES

Gregory: "Uses and Applications of Chemicals and Related Materials," vol. I (1939), and vol. II (1944), pages 542–3, and 301, respectively, Reinhold Pub. Corp., New York.

U. S. Dept. of Agriculture, Pub. E832, December 1951, 4 pages.